March 1, 1960     C. B. GOSMAN     2,926,720
METHOD OF AND APPARATUS FOR MAKING INFLATABLE ARTICLES
Filed Aug. 2, 1957     4 Sheets-Sheet 1
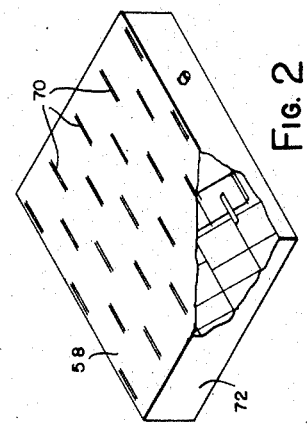
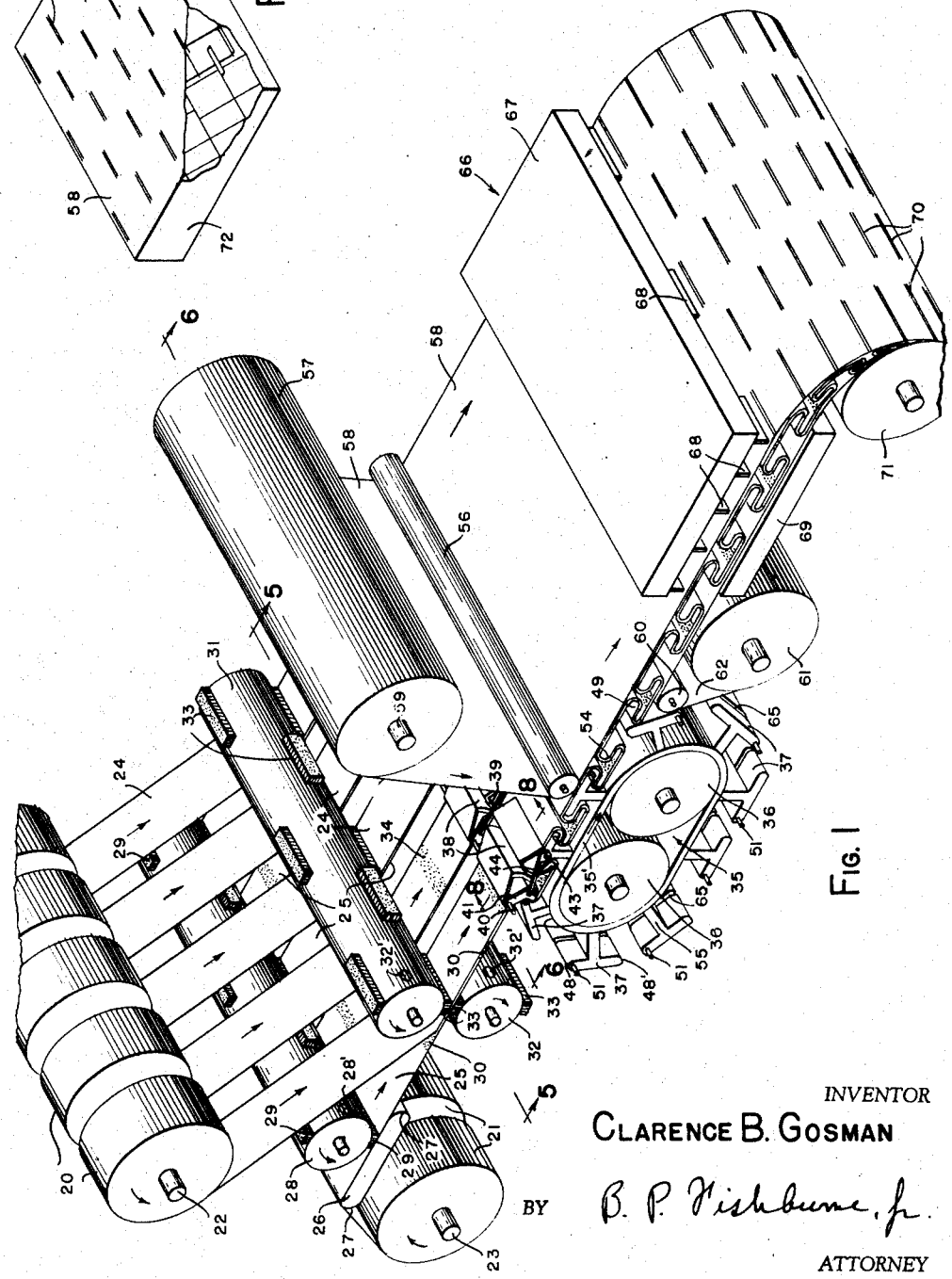
INVENTOR
CLARENCE B. GOSMAN
ATTORNEY March 1, 1960 C. B. GOSMAN 2,926,720
METHOD OF AND APPARATUS FOR MAKING INFLATABLE ARTICLES
Filed Aug. 2, 1957 4 Sheets-Sheet 2
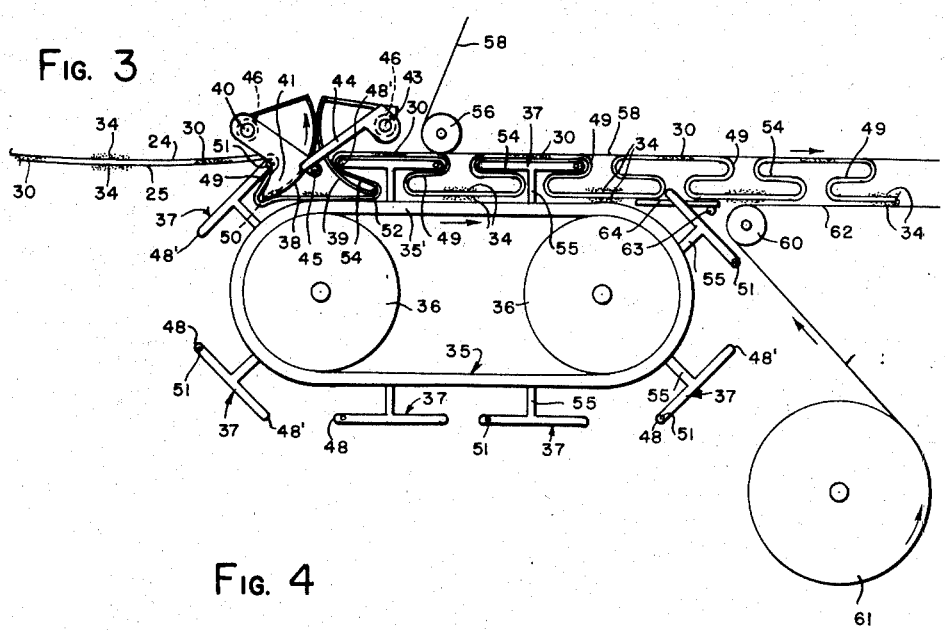
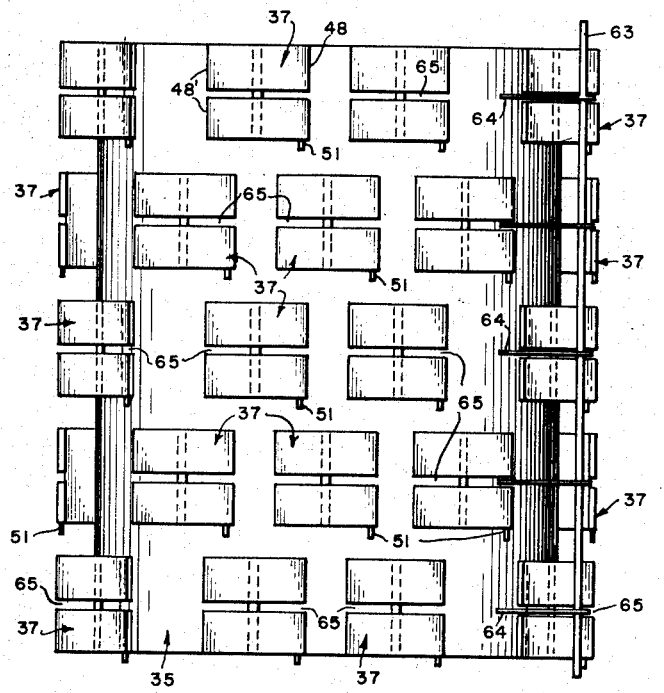
INVENTOR
CLARENCE B. GOSMAN
BY
ATTORNEY March 1, 1960 C. B. GOSMAN 2,926,720
METHOD OF AND APPARATUS FOR MAKING INFLATABLE ARTICLES
Filed Aug. 2, 1957 4 Sheets-Sheet 3

INVENTOR
C. B. GOSMAN
BY B. P. Fishburn, Jr.
ATTORNEY

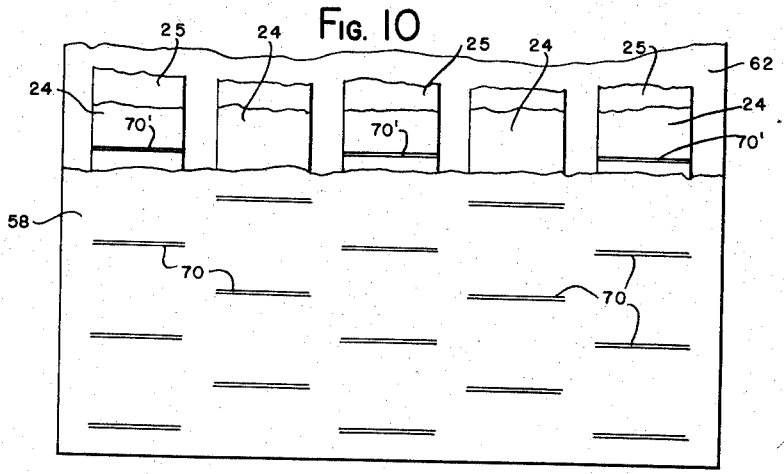
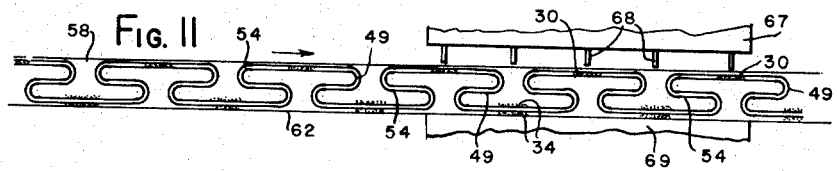
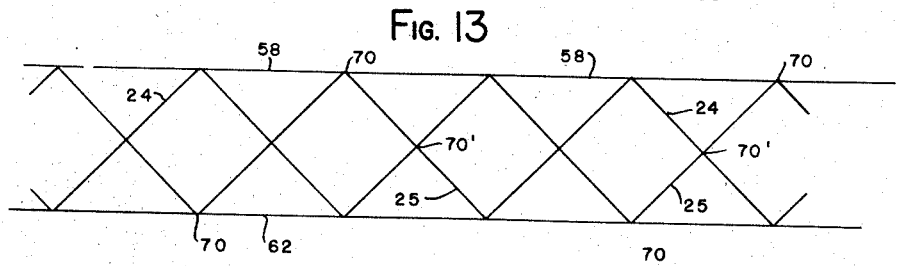
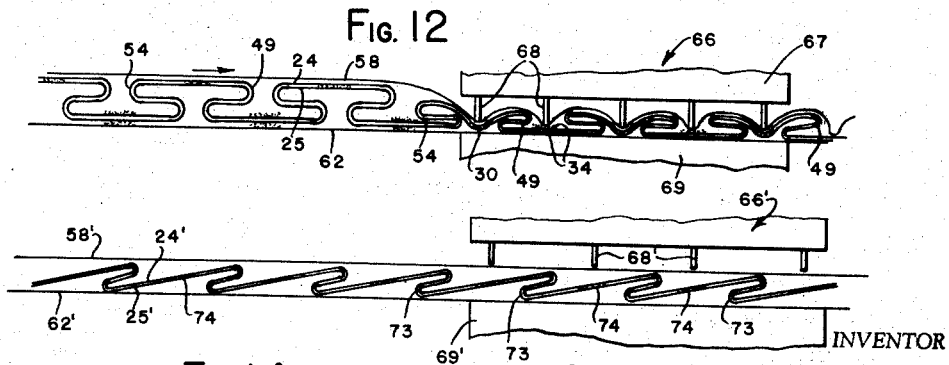
Fig. 10
Fig. 11
Fig. 13
Fig. 12
Fig. 14
INVENTOR
CLARENCE B. GOSMAN
BY
ATTORNEY

United States Patent Office 2,926,720
Patented Mar. 1, 1960

2,926,720

METHOD OF AND APPARATUS FOR MAKING INFLATABLE ARTICLES

Clarence Berveir Gosman, Bellmore, N.Y.

Application August 2, 1957, Serial No. 675,942

11 Claims. (Cl. 154—1.6)

This invention relates to a method of and apparatus for manufacturing inflatable articles, such as inflatable cushions, mattresses and the like.

A primary object of the invention is to provide a highly efficient method and means for manufacturing the inflatable article disclosed and claimed in my co-pending application Serial Number 586,809, filed May 23, 1956, now Patent No. 2,887,692, for Inflatable Cushion or the Like.

Another object of the invention is to provide a novel and simplified method and apparatus for continuously and automatically forming in a rapid and highly efficient manner the composite material to be used for forming the body portions of inflatable articles, such as cushions and mattresses.

Another object is to provide a method of and apparatus for assembling and securing together in a predetermined novel manner the sheet plastics components of the above-mentioned inflatable articles.

Another object is to provide novel means for folding or pleating the interconnecting tapes between the main sheets of the inflatable body portion, to provide slack in the tapes.

A still further object is to provide means including electronic heat sealing apparatus and a heat seal inhibiting coating for the plastics material, which coact with the folding or pleating means in a novel manner to continuously assemble and secure together the flexible components of the inflatable body portion.

Other objects and advantages of the invention will be apparent during the course of the following description.

Figure 5:
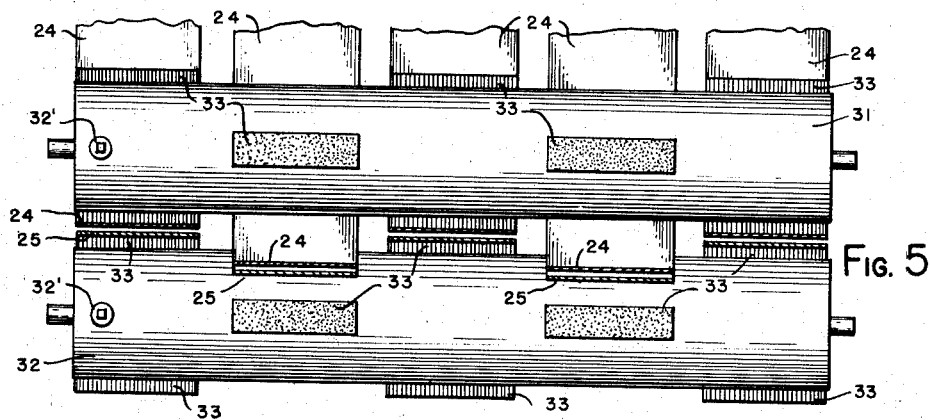
Figure 6:
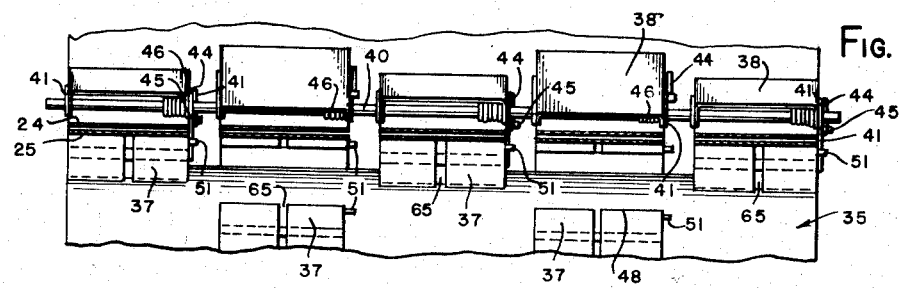
Figure 9:
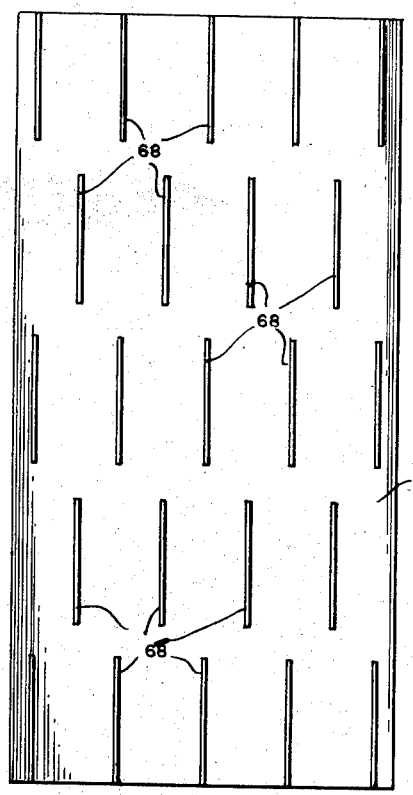
Figure 7:
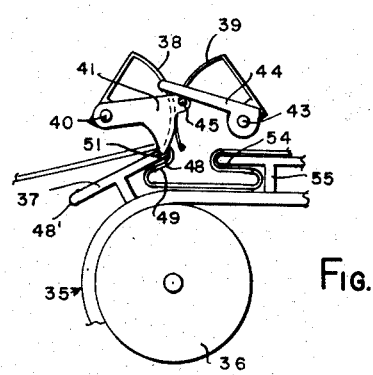
Figure 8:
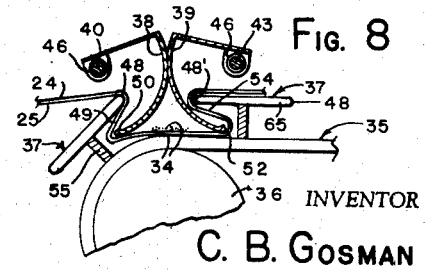

In the accompanying drawings, forming a part of this application, and in which like numerals are employed to designate like parts throughout the same, Figure 1 is a general perspective view, partly diagrammatic, of the apparatus used in the practice of the method, Figure 2 is a perspective view on a reduced scale of an inflated article having a body portion made in accordance with the present method, partly broken away, Figure 3 is an enlarged side elevation, partly diagrammatic, of the tape folding or pleating portion of the apparatus and associated elements, Figure 4 is a plan view of the same, with parts omitted, Figure 5 is an enlarged transverse vertical section taken on line 5—5 of Figure 1, Figure 6 is a fragmentary transverse vertical section taken substantially on line 6—6 of Figure 1, Figure 7 is a fragmentary side elevation of the fold or pleat forming means in a different operative position from that shown in Figure 3, Figure 8 is a fragmentary sectional view similar to Figure 3, taken on line 8—8 of Figure 1, parts omitted, Figure 9 is a bottom plan view of an electronic heat sealing die plate, Figure 10 is a fragmentary plan view of the completed inflatable body portion made in accordance with the method, Figure 11 is an edge elevation, partly diagrammatic, of the composite inflatable body portion, prior to the heat sealing or welding operation, Figure 12 is a similar view of the composite structure at the instant of heat sealing or welding, Figure 13 is a diagrammatic view of the completed body portion or structure in the inflated condition, Figure 14 is an edge elevational view, partly diagrammatic, of an inflatable body portion in accordance with a modification of the invention.

In the drawings, wherein for the purpose of illustration are shown preferred embodiments of the invention, the numerals 20 and 21 designate upper and lower companion series of rolls of flexible plastic tape, such as polyvinyl chloride tape or the like, of a predetermined desired width. This tape is of the type which may be heat sealed or welded to a compatible plastic material or sheet, by means of electronic die apparatus of the general type disclosed in United States Patent 2,631,646. The rolls of tape 20 and 21 are each fixedly mounted in equidistantly spaced relation upon upper and lower horizontal transverse shafts 22 and 23, for rotation therewith. The shafts 22 and 23 are supported and journaled for rotation in a conventional manner, not shown, whereby the individual plastic tapes or webs 24 and 25 may be readily unwound from the rolls 20 and 21.

A horizontal generally flat pallet 26 is fixedly mounted above the lower tape rolls 21 and supported by any suitable means, and extends slightly forwardly of the rolls 21 and for substantially the entire width of the series of rolls 21. The forward and rear edges 27 of the pallet 26 are preferably rounded, as shown, so that the tapes 25 may slide freely over the pallet. The lower tapes 25 pass upwardly from the rear sides of the rolls 21, as they are unwound, and over the top face of the pallet 26 and horizontally forwardly thereof. An elongated cylindrical transverse fountain roll 28 for a liquid coating cement is journaled just above the pallet 26 and extends horizontally for the full width of the pallet and the combined widths of the tapes 25. The fountain roll 28 may have a removable plug 28' to facilitate filling the roll with the liquid cement or coating material. This cement is preferably a conventional contact cement or glue with an oily base, such as tar or asphalt. The particular cement used is characterized by the fact that it will remain tacky after it is applied to the plastic tapes 24 and 25, in a manner to be described, and it will also inhibit or prevent the heat sealing or welding together of the plastic tapes or sheets by the die means at the particular coated surfaces, although not interfering with the heat sealing of adjacent uncoated surfaces. The fountain roll 28 is provided at spaced intervals upon its periphery with cement dispensing brushes or applicators 29, as shown, capable of depositing narrow rectangular areas of the liquid cement upon the upper faces of the tapes 25 in a uniformly spaced manner, as the tapes pass over the pallet 26 and beneath the fountain roll 28, Figure 1. The applicators 29 are spaced longitudinally of the roll 28 distances corresponding to the spacing of the tapes 25, and each applicator 29 is preferably of the same width as the adjacent tape 25. The applicators 29 are arranged in diametrically opposed pairs from the roll 28, and alternate pairs of the applicators are staggered or spaced from adjacent pairs ninety degrees circumferentially of the roll 28. The reason for this spacing of the applicators 29 is so that they will apply the liquid cement in uniformly spaced areas 30 to the top faces of the tapes 25 and with the areas 30 spaced equidistantly, longitudinally of the tapes. Also, the coated areas 30 of alternate tapes 25 will be staggered longitudinally with respect to the areas 30 of adjacent tapes, due to the arrangement of the applicators 29, Figure 1.

The upper tapes 24 are fed downwardly from the rear sides of the rolls 20, slightly in advance of the fountain roll 28 and above the tapes 25, in vertical alignment therewith. A pair of vertically aligned cement fountain rolls 31 and 32, similar to the roll 28, are arranged in advance of the pallet 26. These rolls 31 and 32 have removable filler plugs 32', and are provided with a plurality of cement brushes or applicators 33, identical in size and arrangement to the applicators 29. The upper and lower series of tapes 24 and 25 pass between the fountain rolls 31 and 32, as the latter are caused to rotate in the direction of the arrows, Figure 1, by any suitable means, not shown. It should be mentioned that the fountain roll 28 likewise turns in the direction of the arrow, Figure 1, during the operation of the apparatus, for coating the tops of the tapes 25. The rolls 31 and 32 are timed so that their respective applicators 33 will simultaneously coat the upper faces of the tapes 24 and the lower faces of the tapes 25 with rectangular areas 34 of the cement. The cement coated areas 34 will be equidistantly spaced apart longitudinally of the tapes 24 and 25 and staggered equidistantly, longitudinally of the tapes on alternate tapes, due to the circumferentially spaced relationship of alternate pairs of the applicators 33. Additionally, the arrangement is such, that the coated areas 34 of all of the tapes are staggered longitudinally or arranged midway between the coated areas 30, for a purpose to be described.

As the upper and lower series of tapes 24 and 25 pass beyond the fountain rolls 31 and 32, they are drawn into parallel horizontal superposed contacting relation, and the bottom faces of the tapes 24 will adhere to the cement coated areas 30 of the lower tapes 25. Thus, the upper and lower pairs of tapes after passing between the rolls 31 and 32 will be substantially unitized and will move together longitudinally in the direction of the arrows, during the subsequent operations in the method.

Somewhat in advance of the rolls 31 and 32, means are provided to fold or pleat the unitized pairs of tapes 24 and 25 in a desired manner, and thus provide slack in the interconnecting tapes of the completed inflatable body portion. This means may comprise a horizontally disposed endless carrier or belt 35, having its upper run 35' spaced below the horizontal line of travel of the unitized tapes 24 and 25. The carrier 35 is mounted upon suitable horizontal transverse rolls 36, as shown. One or both of the rolls 36 may be rotated by any conventional means, not shown, so that the upper run 35' will move in the direction of the arrow. The carrier 35 is provided with a plurality of rows of longitudinally equidistantly spaced T-shaped folding or pleating members 37, which are preferably substantially rigid, and secured to the carrier 35 in any desired manner. The rows of T-shaped elements 37 are spaced apart equidistantly, transversely of the carrier 35, and corresponding to the lateral spacing of the pairs of unitized tapes 24 and 25. The T-shaped elements 37 project for substantial distances beyond the outer face of the carrier 35, as shown. The T-shaped elements 37 of alternate rows, Figure 4, are staggered longitudinally. Near the trailing end of the carrier 35 and above the rearmost roll 36 are pairs of cooperating fold or pleat forming baffles 38 and 39. Each pair of baffles 38 and 39, and associated elements, coact with one endless row of the T-shaped elements 37 in the identical manner with every other pair of baffles and row of elements 37, and the following description of the action of one pair of the baffles 38 and 39 and their coacting row of elements 37 should suffice to impart to one skilled in the art, a complete understanding of the fold forming mechanism.

The baffles 38 and 39 of each opposed pair are arcuate, as shown, and each pair of baffles is arranged directly in the path of horizontal travel of one unitized pairs of tapes 24 and 25. The element or baffle 38 of each pair is pivotally mounted for vertical swinging movement upon a fixed horizontal transverse shaft 40, suitably rigidly supported by means not shown. Each baffle 38 is provided at one end with an integral cam crank 41, arranged in a vertical plane. Each baffle 39 is similarly mounted for vertical movement upon a fixed horizontal shaft 43, in advance of the shaft 40, and an operating lever 44 is rigidly secured to one end of the baffle 39 or formed integral therewith. The lever 44 is swingable in a vertical plane and lies adjacent the outer face of the cam crank 41. The cam crank 41 carries a forward lateral pin 45, rigidly secured thereto, and underlying the lever 44 and engaging the same and adapted to lift the lever 44. The cam cranks 41, levers 44 and their associated baffles 38 and 39 are individually pivoted upon the shafts 40 and 43, and torsional coil springs 46 are mounted upon the shafts 40 and 43 and have corresponding ends connected with the respective baffles 38 and 39 to return them normally to their lowered positions, Figure 3, after they have been elevated by the T-shaped elements 37.

The carrier 35 moves in the direction of the arrow, Figure 3, and each T-shaped member 37 of a particular endless row of such members passes adjacent to the associated pair of baffles 38 and 39 which are in the path of travel of the elements 37. The leading edge 48 of each T-shaped member 37, Figure 3, will engage under one unitized pair of the tapes 24 and 25, which are preferably in a slackened condition and free to unwind readily from the rolls 20 and 21, and the leading edge 48 will lift the pair of tapes 24 and 25 and form therein a first or forward fold or pleat 49. This first fold or pleat 49 is formed about the lower transverse trailing edge 50 of the baffle 38, and the leading edge 48 of the T-shaped fold forming member 37 carries the tapes 25 above and forwardly of the edge 50 to form the fold 49 in the tapes. Substanitally simultaneously with this, a short lateral pin 51, rigidly secured to one side of each member 37, adjacent its leading edge 48, will engage the cam crank 41, Figures 3 and 7, and elevate the same and also elevate the baffle 38 in the direction of the arrow, about its shaft 40, in order to remove the baffle 38 from the path of travel of the member 37 which now moves to the right, Figure 3, with the first pleat 49 formed about its leading edge and along the upper horizontal run 35' of the carrier 35. It should be understood that the lateral pins 51 are directly in the path of travel or in the plane of the cam crank 41, at one side of the baffle 38 in each pair of baffles. When the cam crank 41 and its baffle 38 are elevated, the pin 45 of the cam crank will elevate the lever 44 and the associated forward baffle 39 which is fixed to the lever 44 in the direction of the arrow, Figure 3. The lever 44 and baffle 39 will of course turn upon the shaft 43 when they are thus elevated by the pin 45. With the baffles 38 and 39 elevated as in Figure 7, the T-shaped member 37 passes bodily beneath the baffles 38 and 39 with the leading pleat 49 formed about the leading edge 48. The lower edges 50 and 52 of the baffles simply ride over the top face of the member 37, when the element 37 is traveling from its initial pleat forming position of Figure 3 to its subsequent horizontal position on the top run 35'.

When the particular T-shaped member 37 passes from beneath the elevated baffles 38 and 39, the latter, under the influence of the return springs 46 will quickly drop to their lowered positions of Figure 3. The baffle 38 will descend first to its lowered position, because its lower edge 50 will first pass clear of the rear trailing edge 48' of the T-shaped member 37. Subsequently, the lower edge 52 of baffle 39 will clear the trailing edge 48' of the T-shaped element, and the baffle 39 will drop to its position of Figure 3, and the lower edge 52 will instantly form about the rear edge 48' a second or rear fold or pleat 54, similar to the first formed pleat 49. In dropping or returning to its lowered position, Figure 3, the edge 52 of baffle 39 passes under and forwardly of the trailing edge 48' to form upon the T-shaped member 37 the rear pleat 54. It will be understood that the loops 49 and 54 are formed in both superposed tapes 24 and 25 of each pair, the tapes being free to feed out longitudinally from the supply rolls 20 and 21 when acted upon by the members 37 and baffles 38 and 39, as above-described. It will be observed, Figure 3, that the cement coated areas 30 and 34 have a definite relationship or position with respect to the T-shaped members 37 and with respect to the pleats 49 and 54. As shown, the coated areas 34 are positioned midway between each pair of members 37 on the top run 35' of the carrier, and below the horizontal parts of the members 37 and forming the bottom connecting webs of adjacent pairs of pleats 49 and 54. The cement coated areas 30 are arranged above the horizontal parts of the T-shaped members 37 at the centers of the same, and directly above their vertical parts 55. This particular positioning of the coated areas 30 and 34 with respect to the pleats 49 and 54 is important in the subsequent heat sealing or welding operation, to be described.

The folded or pleated tapes 24 and 25 advance to the right, Figures 1 and 3, during the operating of the apparatus, and the same folding or pleating of each pair of unitized tapes 24 and 25 takes place at each pair of baffles 38 and 39 and associated endless rows of members 37. The only difference in the pleating of the several pairs of tapes is that alternate endless rows of the T-shaped members 37 are staggered, Figure 4, and the pleating or folding of alternate tapes is correspondingly staggered, and the subsequent heating sealing will be effected in a corresponding manner, as will become apparent.

Near the longitudinal center of the endless carrier 35 and just above the tops of the T-shaped members 37, a freely rotatable idler roller 56 is suitably journaled by conventional means, not shown. Above this idler roller 56 is a roll 57 of a wide flexible sheet 58 of plastics material, such as polyvinyl chloride sheet material or the like. The width of the upper sheet 58 is preferably equal to the combined widths of the pairs of tapes 24 and 25 plus the spaces between them. The roll 57 is mounted upon a shaft 59, suitably journaled for rotation by conventional means not shown. The plastic sheet 58 is unwound from the rear side of the roll 57 and passes under the idler roller 56 and is then arranged in superposed contacting relation with the tops of the pleated tapes 24 and 25. The idler roller 56 has another purpose, namely, that of pressing down slightly upon the tops of the pleated tapes 24 and 25, traveling with the T-shaped members 37, thereby preventing the previously formed pleats 49 and 54 from being pulled out or straightened by the subsequent formation of additional pleats at the baffles 38 and 39 and associated parts.

Near the forward end of the carrier 35 is suitably journaled for rotation an idler roller 60. This idler roller 60 is slightly in advance of where the T-shaped members 37 pass downwardly about the forward roll 36. A supply roll 61 for a lower flexible plastic sheet 62 of the same width as the sheet 58 is provided, and the plastic sheet 58 is unwound from the forward side of the roll 61 and fed upwardly and over the roller 60, and then forwardly horizontally beneath the pleated tapes 24 and 25 as shown in Figure 3 and also in Figure 1. The sheet 62 is likewise formed of polyvinyl chloride, or some similar heat sealable sheet plastics material. The upper and lower sheets 58 and 62 together with the pleated tapes 24 and 25 are now fed to the right or toward the heat sealing die means to be described, in unison. The several sheets and tapes travel at the same speed and form a composite sandwich-like construction, as shown. There is sufficient tension in the lower horizontal sheet 62 to support the pleated tapes and upper sheet 58 as the flexible sandwich construction travels in the direction of the arrows toward the heat sealing die means.

With reference to Figures 3 and 4, as the pleated tapes 24 and 25 move to the right, the T-shaped members 37 will disengage the tape pleats 49 and 54 and pass downwardly about the forward roller 36. To prevent the pleated tapes from sagging at their points of disengagement from the members 37 and prior to their passing onto the supporting sheet 62, a fixed transverse bar 63 may be provided, just rearwardly of the idler roller 60, and carrying a plurality of laterally spaced rearwardly projecting horizontal fingers 64, rigidly secured thereto, in underlying supporting relation to the forwardly moving pleated tapes 24 and 25. These supporting fingers 64 support the tapes as they are disengaged from the members 37 and pass toward the supporting sheet 62. The members 37 are slotted at their transverse centers, as at 65, to accommodate the fingers 64.

As the upper sheet 58 and pleated tapes 24 and 25 move beyond the roller 60, into sandwich relationship with the lower sheet 62, the pleats 49 and 54 may have a tendency to sag somewhat under their own weight, and the cement coated areas 34 will adhere to the bottoms of the horizontal pleats 49 and 54 as well as to the lower sheet 62 and further render the sandwich construction unitized, and there will be little or no tendency for the pleats to straighten out as the composite flexible structure continues to move toward the die means.

Spaced forwardly of the supply roll 61 is electronic die or heat sealing means 66 of the general type shown in United States Patent 2,631,646. The means 66 comprises an upper plate 67, arranged above the upper sheet 58 and suitably supported and guided for vertical reciprocation by means, not shown. The plate 67 carries a plurality of depending vertical blade-like heat sealing or welding dies 68, rigidly secured thereto and arranged in spaced longitudinal rows, corresponding to the lateral spacing of the superposed tapes 24 and 25 and associated parts previously described. The width of each individual die 68 is preferably equal to the width of a tape 24 or 25. The dies 68 of each longitudinal row are equidistantly spaced apart in such a manner that the individual dies of the row will directly engage the tapes and plastic sheets at the cement coated areas 30 and 34, when the composite structure passes under the die plate 67, Figures 1 and 13. The dies 68 of each row are longitudinally staggered and arranged midway between adjacent pairs of dies of alternate rows, and this staggered arrangement corresponds to the staggered arrangement of the pleat forming members 37 and the staggered arrangement of the cement applicators 29 and 33. Arranged directly below the lower sheet 62 and below the die plate 67 is a ground plate 69, over which the composite sandwich-like flexible structure passes. The electrical connections to the die means 66 are conventional and well-known, and have been omitted for the purpose of simplification.

With reference to Figures 1, 11 and 12, when a series of the pleats 49 and 54 and corresponding areas of the upper and lower sheets 58 and 62 pass between the plates 67 and 69, to a position where the coated areas 30 and 34 are in direct alignment with the dies 68, the forward movement of the composite plastic construction is stopped. The die plate 67 which is normally elevated, Figure 11, is now shifted downwardly, by means not shown, to the position of Figure 12, and the dies 68 engage the top plastic sheet 58 at a plurality of points adjacent the cement coated regions 30 and 34. The dies 68 press the sheets 58 and 62 together with the superposed tapes 24 and 25 between them, and the composite plastic structure is pressed by the dies 68 against the ground plate 69, Figure 12. The high frequency current is now applied to the means 66 and the heat sealing or welding takes place instantly.

The die plate 67 is now elevated to its normal position so that the composite plastic construction may move forwardly again until another series of the pleats 49 and 54 pass beneath the dies 68 as in Figure 11.

During the heat sealing operation, Figure 12, the cement coated areas 30 between the tapes 24 and 25 inhibit or prevent the heat sealing together of the tapes at these areas, but allow the upper tape 24 to be heat sealed or welded to the upper sheet 58 and the lower tape 25 to be heat sealed to the lower sheet 62. Thus, at all of the coated areas 30, the tapes 24 and 25 are heat sealed respectively to the upper and lower sheets 58 and 62, as indicated by the lines of heat sealing or welding 70, which correspond in arrangement and length to the dimensions of the dies 68. It will be noted that the lines of welding or attachment of the tapes 24 and 25 with the top and bottom sheets 58 and 62 are uniformly staggered in their longitudinal rows, Figure 10, as previously explained. Although Figure 10 is a view of the top of the now finished composite body portion, the view or appearance of the bottom of the article will be identical.

Correspondingly, during the heat sealing operation, at each of the coated areas 34, the cement will prevent the welding together of the tapes 24 and 25 with the top and bottom sheets 58 and 62, but will allow the welding together of the tapes 24 and 25 at these regions, where there is no coating on the inner faces of or between the tapes. When the above-described heat sealing operation is completed, the now finished flexible composite plastic structure is wound upon a collection roll 71, as indicated, and this roll is journaled for rotation upon any suitable supporting means, not shown.

The roll 71 may be turned by hand or may be power driven for winding up and causing the desired forward feeding of the work. Likewise, one or both of the rolls 36 may be hand operated or power driven, and the same statement applies in connection with the fountain rolls 28, 31 and 32. When the apparatus is arranged as in Figure 1, the method may be carried out in substantially a continuous manner, with the feeding of the plastic tapes and sheets interrupted only at the moment of heat sealing, when the dies 68 descend into contact with the work. The tapes 24 and 25 are first coated at the rear portion of the apparatus, the folding or pleating of the tapes then takes place near the center of the apparatus, the outside sheets or sides 58 and 62 are then fed into position upon opposite sides of the tapes, the heat sealing or welding of the tapes and sheets next takes place, and finally, the completed article is wound upon the collection roll 71.

Obviously, the finished article may be manufactured in various widths and with various numbers of rows of welding lines 70, and the spacing, number and arrangement, as well as the shape of the welds 70 may be varied as found desirable. It will be of course be understood that adjacent the coated areas 34, the tapes 24 and 25 are welded together in the finished article by lines of welding which are identical to those shown at 70, see Figure 10.

The finished article upon the roll 71 is used particularly for making the inflatable article shown in my copending application Serial Number 586,809, above-mentioned, this article being generally shown in Figure 2 of the drawings of the present application. To complete the article shown in Figure 2, it is merely necessary to provide the marginal wall or web 72 for completely enclosing the structure for inflating, and this is all done in the manner disclosed in the above-mentioned application. As fully explained in the said pending application, the purpose of the pleats 49 and 54 in the tapes is to provide slack in the tapes when they are secured to the sheets 58 and 62, so that the tapes will assume positions such as shown diagrammatically in Figure 13. By virtue of this arrangement, as fully explained in said pending application, the opposite sides 58 and 62 of the cushion remain substantially flat or unpuckered when the article is inflated with air.

In Figure 14 there is shown a slight modification of the composite inflatable article, wherein tapes 24' and 25', similar to the tapes 24 and 25, are previously welded or heat sealed together at each of the points 73, prior to the application of the main plastic sheets 58' and 62' to the opposite sides of the tapes. The tapes 24' and 25' are prefolded or pleated in the manner shown in Figure 14 in any desired manner, and by hand, if desired, and the welding of the tapes at 73 is done in any desired manner. The tapes 24' and 25' have their inner faces coated with cement at equidistantly spaced longitudinal intervals 74, and this coating of the tapes is accomplished in any preferred manner. When the plastic sheets 58' and 62' are arranged in position, Figure 14, the composite structure is passed into die means 66', similar to the die means 66, and the individual dies 68', Figure 14, descend and engage the composite structure at the coated regions 74 in a manner similar to that illustrated in Figure 12, the work being clamped against the ground plate 69' of the heat sealing apparatus 66'. This results in the tapes 24' and 25' being respectively heat sealed or welded to the sheets 58' and 62' at the coated regions 74, the cement coating between the tapes at 74 inhibiting the welding together of the tapes at these points. It is thus seen in Figure 14 that the dies 68' effect only the welding together of the sheets 58' and 62' with the tapes 24' and 25', and do not cause or perform the welding together of the tapes at 73, which was done previously. When the finished product of Figure 14 is inflated, it will assume the shape or condition in cross section shown in Figure 13 in connection with the first form of the article.

It is to be understood that the forms of the invention herewith shown and described are to be taken as preferred examples of the same, and that various changes in the shape, size and arrangement of apparatus components may be resorted to, as well as changes in the method steps and their sequence, without departing from the spirit of the invention or the scope of the subjoined claims.

Having thus described my invention, I claim:

1. A method of making an inflatable body portion for cushions comprising feeding a plurality of superposed pairs of tapes longitudinally in one direction with the pairs of tapes spaced apart and in substantially parallel relation, coating the tapes of each superposed pair upon their inner and outer faces at equidistantly spaced intervals longitudinally of the tapes with a substance adapted to inhibit heat sealing of the tapes to each other and to elements of like material, continuing the longitudinal feeding of the tapes after coating of the same and pleating the tapes of each superposed pair in a uniform and repetitive manner longitudinally of the tapes and so that the coated regions of the tapes have a definite fixed and uniform arrangement relative to the pleats of the tapes, feeding main cover sheets into superposed covering relation with opposite sides of the several pairs of pleated tapes and continuing the feeding of the tapes and sheets at the same speed in one direction, interrupting the feeding of the tapes and cover sheets at a heat sealing station and moving heat sealing die means into contact with the sheets and tapes at the coated regions of the tapes and thereby securing the tapes to each other at the regions where the tapes are coated on their outer faces and securing the tapes to the cover sheets at the regions where the tapes are coated on their inner faces, and then continuing the feeding of the connected tapes and cover sheets and winding the same as a completed composite structure upon a collection roll.

2. A method of making an inflatable article comprising feeding a plurality of superposed pairs of heat sealable plastic tapes longitudinally in one direction with the pairs spaced apart substantially equidistantly and in substantially parallel relation, coating the tapes of each superposed pair at longitudinally equidistantly spaced points upon their inner and outer faces and with the coatings on the inner faces spaced substantially equidistantly from the adjacent coatings upon the outer faces of the tapes in each pair, the coated regions of the tapes of alternate pairs being staggered longitudinally of and substantially midway between the corresponding coated regions of the tapes of adjacent pairs, pleating the tapes of each superposed pair in a uniform repetitive manner longitudinally of the tapes and thereby forming in each pair of tapes a plurality of pairs of spaced opposed loops, the coated regions of the outer faces of the tapes in each pair occurring substantially midway between said opposed loops and the coated regions of the inner faces of the tapes in each pair occurring substantially midway between alternate pairs of the loops, feeding cover sheets of heat sealable plastic material into superposed relation with opposite sides of the pleated tapes, and then heat sealing together the individual tapes of each pair at the regions where the tapes are coated upon their outer faces and heat sealing together the tapes of each pair with said cover sheets at the regions where the tapes are coated upon their inner faces, the coating material on the outer faces of the tapes preventing the heat sealing of the tapes to the cover sheets at such regions and the coating on the inner faces of the tapes preventing the heat sealing together of the tapes at such regions.

3. Apparatus for making inflatable body portions of plastic material comprising means for coating a series of superposed pairs of tapes at longitudinally spaced intervals therealong upon their inner and outer faces as the tapes are fed longitudinally in the same direction from supply rolls, means for pleating the tapes in a repetitive manner longitudinally of the tapes as the pairs of superposed tapes are fed from said coating means, means for feeding cover sheets into superposed relation with the opposite sides of the pleated tapes near said pleating means, heat sealing die means movable into engagement with opposite sides of the cover sheets and pleated tapes to effect the heat sealing together of the tapes in each superposed pair at the regions where the tapes are coated on their outer faces and to simultaneously effect the heat sealing together of the tapes in each pair with the cover sheets at the regions where the tapes are coated upon their inner opposed faces, and means for receiving and storing the composite completed work as the same is fed from said heat sealing die means.

4. Apparatus for making inflatable body portions comprising means for coating a series of laterally spaced superposed pairs of tapes upon their inner and outer faces at longitudinally spaced intervals along the tapes, means for pleating the pairs of tapes in a repetitive manner longitudinally of the tapes after they are coated, means for feeding wide cover sheets into superposed relation with opposite sides of the pleated pairs of tapes, and heat sealing die means movable into engagement with the cover sheets and pleated pairs of tapes to heat seal the tapes of each superposed pair together at the points where the tapes are externally coated and to heat seal the tapes of each pair to the cover sheets at the points where the tapes are coated upon their inner opposed faces.

5. Apparatus for making inflatable structures comprising a plurality of rotatable coating rollers having spaced applicator parts adapted to coat a plurality of superposed tapes at equidistantly spaced intervals longitudinally of the tapes on their inner and outer faces as the tapes travel longitudinally in one direction, movable baffle means disposed in the path of travel of the coated tapes of each pair, an endless carrier disposed near the baffle means, rows of spaced pleat forming elements secured to the endless carrier for movement therewith, said elements adapted to coact with said baffle means to form pleats in the tapes of each pair and to elevate the baffle means from the path of travel of the tapes and pleat forming elements, whereby the pleated tapes may be fed longitudinally by said endless carrier in one direction, means for feeding flexible cover sheets into superposed relation with opposite sides of the pleated tapes, and movable die means to heat seal the tapes of each pair together at certain of the coated regions and to heat seal the tapes of each pair to the cover sheets at other coated regions of the tapes.

6. Apparatus for making inflatable structures comprising an endless carrier, a plurality of laterally spaced longitudinal rows of T-shaped elements secured to said carrier with the elements of each row spaced apart substantially equidistantly, pairs of pivoted cooperating pleat forming baffles arranged in the path of travel of the T-shaped elements of the rows and adapted with the T-shaped elements to form pleats in tapes as the tapes are engaged successively by the T-shaped elements of the rows, means carried by the T-shaped elements and baffles which interengage to cause the pivoting of the baffles in one direction to move the same from the path of travel of the T-shaped elements, said baffles returning automatically to their initial positions after disengagement from the T-shaped elements, means for feeding the tapes into pleat forming engagement with the baffles and T-shaped elements, means for feeding cover sheets into superposed relation with opposite sides of the pleated tapes, and means for securing the cover sheets to the tapes at a plurality of longitudinally spaced points along the pleated tapes and for simultaneously securing the tapes between the cover sheets to each other at a plurality of longitudinally spaced points along the tapes, said last-named points being staggered with respect to the points at which the tapes are secured to the cover sheets.

7. In apparatus for making inflatable structures, an endless conveyor device which is substantially horizontal, longitudinally spaced T-shaped pleat forming elements secured to the conveyor device for movement therewith, a pair of opposed arcuate vertically swingable pivoted baffles arranged near the top run of the conveyor device and near the trailing end thereof in the path of travel of each T-shaped element and adapted to be raised and lowered, engaging means on said baffles whereby when one baffle is elevated it will cause the elevation of the other baffle, an engaging element on each T-shaped element to contact said one baffle and to elevate it from the path of travel of the T-shaped element, the leading edge of each T-shaped element cooperating with said one baffle to form a leading pleat on each T-shaped element and the trailing edge of each T-shaped element cooperating with the other baffle when the other baffle is lowered to form a trailing pleat on each T-shaped element.

8. In an apparatus for forming inflatable articles, a substantially horizontal endless conveyor, laterally spaced rows of T-shaped pleat forming elements secured to the conveyor for movement therewith with the elements in each row spaced apart equidistantly and staggered with respect to the elements in alternate rows, pairs of opposed vertically swingable pleat forming baffles pivotally mounted above the top run of the conveyor and near its trailing end and in the path of travel of the rows of T-shaped elements, engaging parts on the baffles of each pair whereby when one baffle of the pair is elevated it will automatically elevate the other baffle of the pair and both baffles of the pair will be clear of the path of travel of the T-shaped elements in the particular row, cam means carried by the trailing baffle of each pair, and a lateral pin secured to one side of each T-shaped element near its leading edge and adapted to engage said cam means of the trailing baffle to elevate the same, each T-shaped element passing underneath the elevated pair of baffles and then clearing the baffles so that they may drop to their normal lowered positions, each trailing baffle cooperating with the leading edge of each T-shaped element to form a first pleat in a tape and each leading baffle cooperating with the trailing edge of each T-shaped element to form a second pleat in the tape.

9. Apparatus for making inflatable structures comprising coating roller means having axially and circumferentially spaced applicators adapted to coat the inner and outer faces of laterally spaced parallel superposed pairs of longitudinally moving tapes at uniformly spaced intervals longitudinally of the tapes and with said coated intervals staggered longitudinally on alternate tapes, means for forming pleats in each superposed pair of tapes in a uniform and repetitive manner longitudinally of the tapes and for conveying the pleated tapes longitudinally in unison and for staggering the pleats of alternate tapes in a manner corresponding to the staggering of said coated intervals of the several pairs of tapes, means for feeding wide cover sheets into superposed relation with opposite sides of the pleated pairs of tapes to form therewith a flexible sandwich construction, means to move the sandwich construction longitudinally in one direction, and heat sealing die means including a plate having a plurality of projecting dies arranged in spaced rows corresponding to the spacing of the pairs of tapes and with the dies of each row spaced apart corresponding to the spacing of the coated intervals of the pleated pairs of tapes and with the dies of alternate rows staggered to correspond with the staggering of the pleats and coated intervals of the alternate pairs of tapes, said plate having the dies being movable into engagement with one side of the sandwich construction to effect the heat sealing of the tapes of each pair to each other at the point where the tapes are coated on their outer faces and to simultaneously effect the heat sealing of the tapes of each pair to said cover sheets at the points where the tapes are coated upon their inner surfaces.

10. A method of making composite material for inflatable bodies comprising feeding a plurality of pairs of superposed tapes longitudinally in one direction from rolls of tape, continuously pleating the tapes of each pair in a uniform manner and without severing the tapes to provide slack in the tapes, feeding main cover sheets into superposed relation with opposite sides of the pairs of pleated tapes to form a composite structure, feeding the composite structure in said one direction to an attaching station, attaching the tapes in each superposed pair to each other at uniformly spaced intervals longitudinally of the tapes at the attaching station and simultaneously attaching the tapes of each pair to the main cover sheets at uniformly spaced intervals longitudinally of the tapes, the points of attachment of the tapes to each other being staggered longitudinally of the tapes from the points of attachment of the tapes to the main cover sheets, and then winding the composite structure upon a collection roll.

11. A method of making composite material for inflatable bodies comprising feeding a plurality of pairs of superposed tapes longitudinally in one direction with the pairs of tapes arranged in parallel spaced relation, continuously pleating the tapes in each pair in a repetitive uniform manner to form a plurality of upper longitudinally spaced loops and a plurality of lower longitudinally spaced loops in each pair of tapes and with the upper loops staggered longitudinally with respect to the lower loops in each pair of tapes, each said upper loop in each pair of tapes overlying the space between the ends of an adjacent pair of lower loops in each pair of tapes and each lower loop in each pair of tapes underlying the space between the ends of an adjacent pair of upper loops in each pair of tapes, feeding main cover sheets into superposed relation with opposite sides of the pairs of pleated tapes to form a sandwich construction with the main cover sheets covering all of said tapes, and then attaching the tapes in each pair together substantially at the midpoints of said lower loops and adjacent the spaces between the ends of the upper loops and simultaneously attaching the tapes in each pair to the main cover sheets substantially at the midpoints of said upper loops and adjacent the spaces between the ends of the lower loops.

References Cited in the file of this patent

UNITED STATES PATENTS

| | | |
|---|---|---|
| 1,916,483 | Krichbaum | July 4, 1933 |
| 1,970,803 | Johnson | Aug. 21, 1934 |
| 2,196,006 | Benedict | Apr. 2, 1940 |
| 2,318,492 | Johnson | May 4, 1943 |
| 2,475,789 | Kunz | July 12, 1949 |
| 2,513,777 | Andre | July 4, 1950 |
| 2,515,806 | Spanel | July 18, 1950 |
| 2,666,472 | Hosfield | Jan. 19, 1954 |
| 2,672,628 | Spanel | Mar. 23, 1954 |
| 2,724,531 | Kesler et al. | Nov. 22, 1955 |

FOREIGN PATENTS

| | | |
|---|---|---|
| 444,280 | Great Britain | Mar. 18, 1936 |